Patented June 6, 1944

2,350,384

UNITED STATES PATENT OFFICE.

2,350,384

POLYMERIZED RESIN ALCOHOL

Joseph N. Borglin, Wilmington, Del., assignor to Hercules Powder Company, Wilmington, Del., a corporation of Delaware No Drawing. Application May 3, 1941, Serial No. 391,709

17 Claims. (Cl. 260—100)

This invention relates to the alcohols derived from polymerized resin acids and to methods for their production; more particularly, it relates to polymerized abietyl alcohol, hydro polymerized abietyl alcohol and to methods for the production of these compounds.

Rosin is known to be a mixture of various isomeric resin acids, all having the empirical formula $C_{19}H_{29}COOH$, and containing two double bonds per molecule. Structurally, these various resin acids are believed to possess an alkylated phenanthrene nucleus. Hence, whenever, herein, reference is made to a resin acid, there is contemplated a carboxylic acid which has been found to exist in either wood or gum rosin. The literature is replete with references to different isomeric resin acids. The best known of these acids are d-abietic acid, l-abietic acid, d-pimaric acid, l-pimaric acid, sapinic acid, sylvic acid, etc. The relative proportions in which these and other isomeric resin acids exist in a given rosin depends on the source. Thus, wood rosins contain about 10–12% d-pimaric acid, together with about 25–40% abietic acid. French gum rosin is reported to be composed of about 11% d-pimaric acid, about 22% l-pimaric acid, and about 67% sapinic acid; and American gum rosin is said to be of quite similar composition. The proportions of resin acids present in samples of rosin may be changed by isomerization through, for example, heat treatment, etc.

Now, in accordance with the present invention it has been found that the aforesaid resin acids, both in their pure state and where they are found in the form of a crude admixture, such as, in wood and gum rosin, can be converted into new derivatives which have interesting and useful properties. Thus, it has been found that these resin acids or rosin, as the case may be, may be converted into polymeric resin alcohols or hydro polymerized resin alcohols by treating polymerized resin acids or suitable derivatives thereof in such a manner as to convert the carboxyl groups to alcohol groups. It has been found, that by suitable treatment only the carboxyl groups of the polymerized resin acids or their suitable derivatives are affected, resulting in the conversion of the polymerized resin acids or their suitable derivatives to alcohols, whereas it is possible, if desired, by a variation of method, to produce hydro polymerized resin alcohols. Thus, for example, in the case of abietic acid, it is possible starting with polymerized abietic acid to produce either polymerized abietyl alcohol or, as desired, hydro polymerized abietyl alcohol by employing the proper conditions of reaction as hereinafter to be described.

In accordance with the processes of this invention, I may employ as starting material any polymerized rosin, for example, polymerized wood, French gum, American gum rosin, etc. Any of the fifty or more isomeric resin acids having the empirical formula $C_{19}H_{29}COOH$ with two double bonds per molecule and which have been polymerized by suitable treatment may be employed.

In addition to the aforesaid starting materials which may be employed in accordance with the invention, there may be employed the monohydric and polyhydric alcohol esters of the aforesaid polymerized rosins and polymerized resin acids. Thus, for example, there may be employed the monohydric alcohol esters, as the methyl, ethyl, propyl, isopropyl, butyl, isobutyl, oleyl, lauryl, abietyl, hydrogenated abietyl, furfuryl, tetrahydrofurfuryl, allyl, isoamyl, phenyl, benzyl, bornyl, cetyl, fenchyl, alcohol esters, etc.; the polyhydric alcohol esters, as the ethylene glycol, diethylene glycol, triethylene glycol, glycerol, erythritol, pentaerythritol, sorbitol, mannitol, etc., esters. These various polymerized esters, as desired, may be prepared from the desired resin acids by polymerization of the resin acids first with esterification thereafter, or monomeric resin acids may first be esterified and the esters themselves polymerized.

The polymerization of the rosins, resin acids, and derivatives thereof may be accomplished by any of the methods known in the art. Thus, for example, these materials may be polymerized by treatment with sulfuric acid, boron trifluoride, stannic chloride, zinc chloride, aluminum chloride, hydrofluoric acid, etc., or by treatment of the materials with a high voltage, high frequency discharge, or by treatment with an acid sludge formed by treatment of rosin with sulfuric acid. The polymerization by any of these methods is usually carried out with the material dissolved in some suitable organic solvent. In the particular case of preparing polymerized rosin, it is, in general, desirable to employ a rosin from which most of the color bodies have been removed by prior treatment. In addition, the polymerized rosins may, after polymerization, be further refined by means of selective solvents, such as, furfural, furfuryl alcohol, phenol, etc., and also by means of adsorbents, such as, fuller's earth, activated carbon, etc. These refined polymerized rosins may then be further refined by a bleach treatment, such as, subjecting them to the action of zinc and sodium bisulfate, heat and carbon dioxide, etc. Furthermore, the polymerized rosins, resin acids and esters thereof, which may be used as starting materials in accordance with this invention, may be vacuum distilled prior to use to remove any monomeric resin acids or esters thereof. In this manner the substantially pure dimer is obtained.

Now, in accordance with the processes of this invention, it has been found that any of the aforesaid starting materials may be converted into the corresponding polymerized resin alcohols by treatment of the particular starting material with an alkali metal and a lower aliphatic alcohol, and thereafter hydrolyzing the resulting alcoholate to the alcohol. By this procedure the carboxyl group is selectively reduced to an alcohol group without the attendant reduction of the unsaturated double bonds of the polymerized resin acids. Thus, for example, in the case of polymerized abietic acid, the product will be polymerized abietyl alcohol.

In accordance with this procedure, any of the aforesaid starting materials may be used, however, it is preferred that the material employed be an ester, for example, polymerized methyl abietate, a polymerized glycerol abietate, etc. The alcohols employed for the reduction may be any of the lower aliphatic alcohols and generally will comprise those having less than 5 carbon atoms per molecule, for example, methyl, ethyl, propyl, isopropyl, n-butyl, 2-butyl, 3-butyl, amyl, isobutyl, alcohols, glycol, glycerol, etc. It has been found that especially good results are obtained when n-butyl alcohol is used.

The amount of alkali metal used will preferably be the amount stoichiometrically required as determined by the following equation:

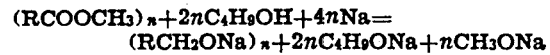

where $n$=number of monomeric molecules associated with one polymer molecule.

where

R=the hydrocarbon nucleus of a resin acid.

However, larger amounts of alkali metal may be used. The amount of aliphatic alcohol employed may also be the stoichiometrically required amount; preferably, however, an excess is employed to act as a solvent medium for the reaction. If no excess of aliphatic alcohol is used, it is desirable to employ some other solvent medium to maintain a fluid state in the reaction vessel. This solvent, if one is employed, will be inert to the reactants and preferably immiscible with water. Suitable solvents comprise aromatic hydrocarbons, as, toluene, xylene, ethyl benzene, isopropyl benzene, etc., paramenthane, and aliphatic ethers, as, dibutyl ether, dialkyl glycol ethers, trialkyl glycerol ethers, etc.

In proceeding in accordance with this method, the reactants are contacted in a suitable vessel which is desirably equipped to reflux the reaction mixture. Care should be taken to keep water out of the vessel to prevent gel or soap formation. Although any desired method of contacting the reactants may be employed, it is preferred that the alkali metal be placed in the reaction vessel and the polymerized methyl abietate, for example, dissolved in the lower aliphatic alcohol added thereto with agitation. The alkali metal may originally be in the form of solid particles, or molten, or in suspension in a suitable solvent medium such as xylene. The rate of addition is not critical, however, if the alcohol being added is hygroscopic, rapid addition is advisable to prevent it from absorbing an undesirable amount of moisture from the atmosphere. After the alcohol and polymerized resin acid or derivative thereof, along with an inert solvent as desired, have been added, the reaction mixture will be agitated at a temperature of 80° C. to 200° C. and preferably at a temperature of 115° C. to 160° C. As a practical matter, this heating will be carried out at the reflux temperature of the mixture. Atmospheric pressure may be conveniently employed for the reaction, although elevated pressures may be employed with higher operating temperatures being consequently operable.

The reaction mixture may be heated with agitation for a period up to 8.0 hours, however, normally, heating and agitation need not be continued for more than 2.0 hours. After the reaction mixture has cooled, ethyl alcohol is added to destroy any unreacted traces of sodium. The mixture is then washed with water, afterwards washed with a mineral acid, such as, phosphoric acid, and finally washed with water. The polymerized resin alcohol is recovered as the residue when the solvent and lower aliphatic alcohols are distilled off.

Now, in accordance with another procedure of this invention, I may take any of the starting materials hereinbefore described, which materials include polymerized rosins, polymerized resin acids, and the esters derived from these rosins and resin acids, and by reacting them with hydrogen in the presence of certain catalysts under suitable conditions of temperature and pressure convert the carboxyl group to an alcohol group and in addition introduce hydrogen into the unsaturated double bonds of the polymerized resin nuclei. The resulting product is a hydro polymerized resin alcohol. The conversion of the carboxyl group to the alcohol group and the reaction at the double bonds apparently take place simultaneously for the product is always the hydro polymerized resin alcohol. Of course, if a material, such as, polymerized abietyl alcohol obtained by treatment of polymerized abietic acid with an alkali metal and an alcohol as described herein, is employed, hydrogen will add to the unsaturated double bonds.

In accordance with this procedure, a suitable starting material, as, for example, polymerized abietic acid, will be contacted with hydrogen in the presence of one of a group of catalysts which include the oxides of zinc, cobalt, iron, manganese, magnesium, calcium, barium, molybdenum, and nickel, and the chromites of copper, zinc and nickel. Preferably, the catalyst employed will be of the chromite type. Hereinafter, the above catalysts which accomplish the reduction of the carboxyl groups of polymerized resin acids and their derivatives and simultaneously catalyze the hydrogenation of unsaturated double bonds of the hydrocarbon nuclei of the resin acids of their derivatives will be referred to as conversion catalysts. As desired, mixtures of several of the aforesaid catalysts may be employed. The catalyst may be reduced with hydrogen separately prior to use or in some instances may be employed without previous reduction, since it may readily be reduced by the hydrogen under the temperature and pressure conditions employed in the reaction. The catalyst may be used in any suitable form as, for example, in powdered form or supported on a suitable inert material.

In accordance with this procedure, the polymerized abietic acid, for example, will be contacted with hydrogen in the presence of the catalyst at a temperature between about 225° C. and about 375° C., preferably between about 275° C. and about 325° C. The hydrogen pressure will be between about 70 and about 500 atmospheres and preferably between about 100 and about 300 atmospheres. While under certain circumstances it may be desirable to carry out the reaction in the vapor phase, ordinarily the liquid phase is preferred. To attain the liquid phase the polymerized resin acids or their derivatives, as the case may be, may be heated to molten condition, or, if desired, they may be dissolved in a suitable inert solvent and the solution so formed treated with the catalyst. Thus, for example, aliphatic hydrocarbons, the various petroleum fractions, monocyclic aromatic hydrocarbons, hydrogenated aromatic hydrocarbons, etc., are suitable for the purpose.

There follow several specific examples which illustrate particular embodiments of the processes of the present invention. All parts and percentages in the specification and claims are by weight unless otherwise indicated.

Example 1

Fifty-eight parts of sodium were placed in a flask equipped with a reflux condenser. To this was added 120 parts of the methyl ester of polymerized rosin, dissolved in 340 parts of anhydrous n-butyl alcohol. The methyl ester had a drop melting point of approximately 50 to 60° C. The polymerized rosin from which the ester was prepared had a drop melting point of 100° C. and an acid number of 156. The reaction mixture was heated at reflux temperature with stirring for 3 hours. 315 parts of ethyl alcohol were then added to destroy excess sodium. The reaction mixture was then diluted with 300 parts of water, the insoluble products separated, washed with aqueous 10% $H_3PO_4$ and then with water. Evaporation of the n-butyl, methyl and ethyl alcohol gave 96 parts of polymerized rosin alcohol. The product analyzed 4.6% hydroxyl content by the Zerewitinoff method and had a drop melting point of 60° C. The theoretical hydroxyl content for the product based on the methyl ester of polymerized rosin employed is 4.95%.

Example 2

The procedure of Example 1 was duplicated with the exception that the methyl ester of polymerized d-pimaric acid was employed in place of the methyl ester of polymerized rosin. This methyl ester of polymerized d-pimaric acid was a semi-solid and had a drop melting point between 50 and 60° C. The polymerized d-pimaric acid from which the ester was made had an acid number of 148. 99.6 parts of polymerized d-pimaryl alcohol resulted. The hydroxyl content by the Zerewitinoff method was 4.4%. The theoretical hydroxyl content for the product based on the polymerized d-pimaric acid employed is 4.68%.

Example 3

One hundred parts of polymerized abietic acid, having a drop melting point of 140° C. and an acid number of 145, were dissolved in 150 parts of dioxane and 20 parts of copper chromite were added. The mixture was placed in a pressure bomb and shaken at 250° C. to 350° C. for 14 hours at 2000 to 3000 lbs./sq. in. hydrogen pressure. 1.30 parts of hydrogen were absorbed. The catalyst and dioxane were then removed to yield a product having a hydroxyl content by the Zerewitinoff method of 3.57%. The theoretical hydroxyl content based on the polymerized abietic acid employed is 4.58%. Hence, it is apparent that there was a conversion of 78% of the polymerized abietic acid to hydro polymerized abietyl alcohol.

Example 4

One hundred parts of the methyl ester of polymerized sapinic acid, having a drop melting point of approximately 50 to 60° C., were dissolved in 150 parts of dioxane and 20 parts of copper chromite added. The polymerized sapinic acid from which the ester was made had an acid number of 156. The mixture was placed in a pressure bomb and shaken at 250° C. to 350° C. for 14 hours at 2000 to 3000 lbs./sq. in. hydrogen pressure. 1.28 parts of hydrogen were absorbed. The catalyst was then removed and the dioxane and methyl alcohol removed by vacuum distillation. There remained 69 parts of hydro polymerized sapinyl alcohol, having a hydroxyl content of 3.8% by the Zerewitinoff method. The theoretical hydroxyl content for the product based on the methyl ester of polymerized sapinic acid employed is 4.95%.

Example 5

One hundred parts of the dimer of abietic acid, having a drop melting point of 185° C. and an acid number of 135, were dissolved in 150 parts of dioxane and 20 parts of copper chromite were added. The mixture was placed in a pressure bomb and shaken at 250° C. to 350° C. for 14 hours at 2000 to 3000 lbs./sq. in. hydrogen pressure. 1.23 parts of hydrogen were absorbed. The catalyst and dioxane were then removed to yield a product having a hydroxyl content by the Zerewitinoff method of 4.2%. The theoretical hydroxyl content based on the dimer of abietic acid employed is 4.25%. Hence, it is apparent that there was a conversion of 98.7% of the abietic acid dimer to hydro dimeric abietyl alcohol.

Example 6

The procedure of Example 1 was duplicated with the exception that the dimer of abietic acid was employed in place of the methyl ester of polymerized rosin. This dimer of abietic acid had a drop melting point of 185° C. and an acid number of 135. 90 parts of a product resulted which was the dimer of abietyl alcohol. It had a hydroxyl content of 3.7% by the Zerewitinoff method. The theoretical hydroxyl content for the product based on the dimer of abietic acid employed is 4.25%.

The polymerized resin alcohols prepared in accordance with this invention are not completely stable to oxidation at their ethylenic linkages but may be made completely stable by treatment with hydrogen in the presence of a hydrogenation catalyst as platinum oxide. On the other hand, the hydro polymerized resin alcohols are, in particular, substantially completely stable to oxidation at points other than their hydroxyl groups. Hence, the tendency is for these new compounds to have less reactivity than have the monomeric resin alcohols. Both the polymerized resin alcohols and the hydro polymerized resin alcohols have lower vapor pressures than the monomeric resin alcohols. If desired, the polymerized resin alcohols or the hydro polymerized resin alcohols may be vacuum distilled to remove any monomeric alcohols present, leaving as residue the substantially pure dimeric resin alcohols or hydro resin alcohols as the case may be.

The alcohols produced in accordance with this invention have varied uses in the commercial arts. If they are sulfonated, the resulting products may be used as wetting and emulsifying agents. They may be esterified with mono- and polycarboxylic acids to yield esters suitable for use in protective coatings. The ether derivatives of these alcohols may be prepared and employed as plasticizers. Oxidation of the alcohols yields aldehydes which in turn may be condensed with phenolic substances to give moldable compositions. The alcohols and their derivatives may, in addition, be employed in textile finishing materials, protective coatings, adhesive compositions, etc.

Where in this specification and claims the term "carboxyl group" is used, such is intended to include a "modified carboxyl group" such as one which has been esterified as equivalent for the normal carboxyl group. Thus, the term is intended to include as equivalents the group COOH and COOR where R is, for example, an alkyl group.

It will be understood that the details and examples hereinbefore set forth are illustrative only and that the invention as broadly described and claimed is in no way limited thereby.

What I claim and desire to protect by Letters Patent is:

1. A polymerized rosin alcohol.
2. A hydrogenated polymerized rosin alcohol.
3. A polymerized abietyl alcohol.
4. A polymerized sapinyl alcohol.
5. A polymerized pimaryl alcohol.
6. Hydrogenated polymerized abietyl alcohol.
7. Hydrogenated polymerized sapinyl alcohol.
8. Hydrogenated polymerized pimaryl alcohol.
9. The process of producing a polymerized rosin alcohol which comprises effecting carboxylic reduction of a material selected from the group consisting of polymerized rosin acids, their esters, polymerized rosin, and esters thereof, with a lower aliphatic alcohol and an alkali metal, hydrolyzing the product and recovering the polymerized rosin alcohol.
10. The process of producing a polymerized rosin alcohol which comprises effecting carboxylic reduction of a material selected from the group consisting of polymerized rosin acids, their esters, polymerized rosin, and esters thereof, with a lower aliphatic alcohol and an alkali metal at a temperature between about 80° C. and about 200° C., hydrolyzing the product and recovering the polymerized rosin alcohol.
11. The process of producing a polymerized rosin alcohol which comprises effecting carboxylic reduction of a material selected from the group consisting of polymerized rosin acids, their esters, polymerized rosin, and esters thereof, with a lower aliphatic alcohol and an alkali metal at a temperature between about 115° C. and about 160° C., hydrolyzing the product and recovering the polymerized rosin alcohol.
12. The process of producing a polymerized rosin alcohol which comprises effecting carboxylic reduction of a material selected from the group consisting of polymerized rosin acids, their esters, polymerized rosin, and esters thereof, with a lower aliphatic alcohol and an alkali metal at the reflux temperature of the reaction mixture, hydrolyzing the product and recovering the polymerized rosin alcohol.
13. The process of producing a polymerized rosin alcohol which comprises effecting carboxylic reduction of a material selected from the group consisting of polymerized rosin acids, their esters, polymerized rosin, and esters thereof, with n-butyl alcohol and an alkali metal at the reflux temperature of the reaction mixture, hydrolyzing the product and recovering the polymerized rosin alcohol.
14. The process of producing a polymerized rosin alcohol which comprises effecting carboxylic reduction of a material selected from the group consisting of polymerized rosin acids, their esters, polymerized rosin, and esters thereof, with a lower aliphatic alcohol and an alkali metal in the presence of an inert solvent for the non-metallic reactants, at an elevated temperature, hydrolyzing the product and recovering the polymerized rosin alcohol.
15. The process of producing a polymerized rosin alcohol which comprises effecting carboxylic reduction of an ester of polymerized rosin acid with a lower aliphatic alcohol and an alkali metal at an elevated temperature, hydrolyzing the product and recovering the polymerized rosin alcohol.
16. The process of producing a polymerized abietyl alcohol which comprises effecting carboxylic reduction of an ester of polymerized abietic acid with a lower aliphatic alcohol and an alkali metal at an elevated temperature, hydrolyzing the product and recovering the polymerized resin alcohol in any suitable manner.
17. The process of producing a polymerized abietyl alcohol which comprises effecting carboxylic reduction of an ester of polymerized abietic acid with n-butyl alcohol and an alkali metal at the reflux temperature of the reaction mixture, hydrolyzing the product and recovering the polymerized resin alcohol in any suitable manner.

JOSEPH N. BORGLIN.